(12) United States Patent
Rubinstein et al.

(10) Patent No.: US 7,289,449 B1
(45) Date of Patent: Oct. 30, 2007

(54) DEVICE AND METHOD FOR MANAGING FAULT DETECTION AND FAULT ISOLATION IN VOICE AND DATA NETWORKS

(75) Inventors: Alan Rubinstein, Fremont, CA (US); Bhakt Patel, Campbell, CA (US)

(73) Assignee: 3Com Corporation, Marlborough, MA (US)

( * ) Notice: Subject to any disclaimer, the term of this patent is extended or adjusted under 35 U.S.C. 154(b) by 376 days.

(21) Appl. No.: 09/923,848

(22) Filed: Aug. 6, 2001

Related U.S. Application Data (60) Provisional application No. 60/277,593, filed on Mar. 20, 2001, provisional application No. 60/277,767, filed on Mar. 20, 2001, provisional application No. 60/277,451, filed on Mar. 20, 2001, provisional application No. 60/277,592, filed on Mar. 20, 2001, provisional application No. 60/285,419, filed on Apr. 20, 2001.

(51) Int. Cl.
*H04J 1/16* (2006.01)
*H04J 3/14* (2006.01)
*H04L 1/00* (2006.01)
*H04L 12/26* (2006.01)

(52) U.S. Cl. ...................... 370/245; 370/242; 370/216; 370/244

(58) Field of Classification Search ................ 370/242, 370/243, 244, 245, 249, 229, 445
See application file for complete search history.

(56) References Cited

U.S. PATENT DOCUMENTS 5,276,440 A * 1/1994 Jolissaint et al. ...... 340/825.02

(Continued)

FOREIGN PATENT DOCUMENTS

| EP | 0 573204 A2 | 12/1993 |
|---|---|---|
| WO | WO 99/57854 | 11/1999 |
| WO | WO 00/30293 | 5/2000 |

OTHER PUBLICATIONS

Huang J. et al., "An Open Solution to Fault-Tolerant Ethernet: Design, Prototypig and Evaluation" Performance, Computing and Communications Conference, 1999 IEEE International Scottsdale, AZ USA Feb. 1-12, 1999, Piscatawa, NH, USA IEEE, US Feb. 1, 1999, pp. 461-468, XP010323654 ISBN: 0-7803-5258-0 p. 461.

(Continued)

*Primary Examiner*—Chirag G. Shah (57) ABSTRACT

The present invention provides a device and method for managing fault detection and isolation in voice and data networks. Specifically, the present invention is a device and method for fault detection and fault isolation that can be used to validate connectivity of a central site to a number of connected client devices. The present invention operates stage by stage, working from the central site back to a connected client device. The present invention can be controlled from a central maintenance station and as such does not require direct user enabling. In one embodiment, the present invention provides an intelligent device (e.g., an intelligent data concentrator) for coupling an electronic device to a network comprising a first interface for communicatively coupling the intelligent device to the network and a second interface for communicatively coupling the intelligent device to a plurality of client devices such that the client devices are communicatively coupled to the network. The intelligent device also comprises means for processing and interpreting data coupled to the first interface, and fault detection means coupled to the means for processing and interpreting data, wherein the fault detection means performs fault detection in the network. In one embodiment, the intelligent device operates in conjunction with a central control site in performing fault detection.

20 Claims, 6 Drawing Sheets

U.S. PATENT DOCUMENTS

| | | | | |
|---|---|---|---|---|
| 5,636,204 | A | * | 6/1997 | Mizuno et al. ............. 370/245 |
| 5,703,872 | A | * | 12/1997 | Boggs et al. ............... 370/252 |
| 5,963,540 | A | * | 10/1999 | Bhaskaran .................. 370/218 |
| 6,021,495 | A | | 2/2000 | Jain et al. .................... 713/201 |
| 6,085,243 | A | * | 7/2000 | Fletcher et al. ............. 709/224 |
| 6,175,553 | B1 | * | 1/2001 | Luk et al. .................... 370/222 |
| 6,278,695 | B1 | * | 8/2001 | Christensen et al. ........ 370/254 |
| 6,392,990 | B1 | * | 5/2002 | Tosey et al. ................. 370/218 |
| 6,550,029 | B1 | * | 4/2003 | Bailey et al. ................ 714/724 |

OTHER PUBLICATIONS

Anonymous: "Black Box-Modular Intelligent Hub" Black Box Corp., Online 1997, pp. 1-4, XP002233813 Retrieved from the Internet: URL:http://www.blackbox.com/faxbacks/19000/19242.PDF.

Protogers A. Et Al.: "Traffic Analyser And Generator/Traffic Capture, Generation, Statistics And Network Integrity Tests Program In C" Computer Communications. Elsevier Science Publishers BV, Amsterdam, NI, vol. 13, No. 8, Oct. 1, 1990, pp. 469-477, XP000161022 ISSN: 0145-3664 p. 473, Left-Hand Column, Paragraph 2 p. 474, Paragraph 1; Figure 6.

IEEE: "P802.3af-IEEE DTE Power via MDI Objectives" IEEE 802.3 Standard, Online Nov. 10, 1999, p. 1 XP002233819, Retrieved from the Internet: URL:http://grouper, ieee.org/groups./802/3/af/objectives.pdf, retrieved Mar. 7, 2003.

Fletcher P: Ethernet Analyzer Spots Trouble Before the Network Crashes: Electronics, VNU Business Publications, New York, US vol. 61, No. 4 Feb. 18, 1988, pp. 54D-54E, XP000811430 ISSN: 0883-4989 p. 54D.

U.S. Appl. No. 60/271,858, Glen D. Stone, et al.

* cited by examiner

DEVICE AND METHOD FOR MANAGING FAULT DETECTION AND FAULT ISOLATION IN VOICE AND DATA NETWORKS

RELATED U.S. APPLICATIONS

This application claims priority to the copending provisional patent applications: patent application Ser. No. 60/277,593, entitled "'Intellijack' physical concepts," with filing date Mar. 20, 2001, and assigned to the assignee of the present invention; patent application Ser. No. 60/277,767, entitled "A method for managing intelligent hardware for access to voice and data networks," with filing date Mar. 20, 2001, and assigned to the assignee of the present invention; patent application Ser. No. 60/277,451, entitled "A method for filtering access to voice and data networks by use of intelligent hardware," with filing date Mar. 20, 2001, and assigned to the assignee of the present invention; patent application Ser. No. 60/277,592, "'Intellijack' usage," with filing date Mar. 20, 2001, and assigned to the assignee of the present invention; and patent application Ser. No. 60/285,419, "Intelligent concentrator," with filing date Apr. 20, 2001, and assigned to the assignee of the present invention.

FIELD OF INVENTION

The present invention relates to the field of computer networks. In particular, the present invention relates to a device and a method for fault detection in voice and data networks.

BACKGROUND OF THE INVENTION

Installation and maintenance of a network of devices connected by network cabling is typically a labor and time intensive endeavor. If a client device loses the integrity of its connection to the network, an investigation as to what cause the connection loss must be initiated.

Current maintenance of devices, such as a client personal computer (PC), directly connected to a local area network (LAN) over a dedicated drop is performed by instructing an end user to act as the local agent/robot for the information systems (1S) technician. The IS technician will instruct the user to perform tests and read screens for the technician. If these attempts at resolving the problem fail, a technician is dispatched to the location of the end user.

An alternate method is to use a software remote control package enabled by the end user to gain control of the PC operating to allow a remote agent to take control of the client PC. Control of the client PC by the IS technician can only be performed after specific direct actions are taken by the end user. The IS technician must rely on the user of the client device to install the software remote control package, to accurately follow instructions and relay information to the IS technician. Often, users are not as knowledgeable as the IS technician would require, and a technician must be dispatched to the location of the user.

The cost of supporting the distributed network infrastructure is high, this is especially true if direct at the desk support is required. Often, maintenance problems are compounded where an IS technician must communicate with the end user. This communication often requires the user to call an IS hotline, wait on hold for a period of time, and ultimately talk to an IS technician. In addition to cutting into the end user's productivity, the IS technician is required to assist the end user rather than performing other functions of his or her job. Additionally, each time a technician is dispatched to a client device to fix the connection failure, a relatively high cost is incurred.

Accordingly, a need exists for a method for fault isolation that can be used to validate connectivity of a central site to a number of connected client devices. A need also exists for a method that satisfies the above need and that operates stage by stage, working from the central site back to a connected client device, in validating connectivity. A need also exists for a method that satisfies the above needs and that can be controlled from a central maintenance station and as such does not require direct user enabling.

SUMMARY OF THE INVENTION

The present invention provides a device and method for managing fault detection and isolation in voice and data networks. Specifically, the present invention is a device and method for fault detection and fault isolation that can be used to validate connectivity of a central site to a number of connected client devices. The present invention operates stage by stage, working from the central site back to a connected client device. The described method can be controlled from a central maintenance station and as such does not require direct end-user enabling.

In one embodiment, the present invention provides an intelligent device (e.g., an intelligent data concentrator) for coupling an electronic device to a network comprising a first interface for communicatively coupling the intelligent device to the network and a second interface for communicatively coupling the intelligent device to a plurality of client devices such that the client devices are communicatively coupled to the network. The intelligent device also comprises means for processing and interpreting data coupled to the first interface, and fault detection means coupled to the means for processing and interpreting data, wherein the fault detection means performs fault detection in the network.

In one embodiment of the present invention, the head end is a central control site operable to remotely access the means for processing and interpreting data of the intelligent data concentrator. By communicating with the intelligent data concentrator, the head end is able to perform fault detection and isolation in the network. In one embodiment, the fault detection means is configured to isolate faults in both an uplink from the head end of the network and a downlink from the head end of the network.

In one embodiment, the fault detection means is selected from the group consisting essentially of: a link beat signal fault detection, a ping signal fault detection, and a loop-back mode for fault detection.

In one embodiment, the intelligent device is configured such that the intelligent device is provided power over the network. In one embodiment, the intelligent device is configured such that it provides power to connected client devices. In one embodiment, the head end is configured to activate and deactivate the intelligent device over the network. In another embodiment, the intelligent device is configured to activate and deactivate connected client devices.

In another embodiment, the intelligent device employs time domain reflectometry (TDR) measurement techniques such that fault detection means is operable to determine a distance from the intelligent device to the fault.

In another embodiment, the head end is configured to transmit data packets to the intelligent device such that diagnostic tests can be performed at the intelligent device for validating network connections.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

In the following detailed description, for purposes of explanation, numerous specific details are set forth in order to provide a thorough understanding of the present invention. However, it will be apparent to one skilled in the art that the present invention may be practiced without these specific details. In other instances, well-known structures and devices are not described in detail in order to avoid obscuring aspects of the present invention.

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here and generally conceived to be a self-consistent sequence of steps of instructions leading to a desired result. The steps are those requiring physical manipulations of data representing physical quantities to achieve tangible and useful results. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing", "interpreting", "providing", "monitoring", "detecting" or the like, refer to the actions and processes of a computer system, or similar electronic computing device. The computer system or similar electronic device manipulates and transforms data represented as electronic quantities within the computer system's registers and memories into other data similarly represented as physical quantities within the computer system memories into other data similarly represented as physical quantities within the computer system memories or registers or other such information storage, transmission, or display devices.

Portions of the present invention are comprised of computer-readable and computer executable instructions which reside, for example, in computer-usable media of a computer system. It is appreciated that the present invention can operate within a number of different computer systems including general purpose computer systems, embedded computer systems, and stand alone computer systems specially adapted for controlling automatic test equipment.

The present invention provides a device and method for managing fault detection and isolation in voice and data networks. Specifically, the present invention is a device and method for fault detection and fault isolation that can be used to validate connectivity of a central site to a number of connected client devices. The present invention operates stage by stage, working from the central site back to a connected client device. The described method can be controlled from a central maintenance station and as such does not require direct user enabling.

Figure 1:
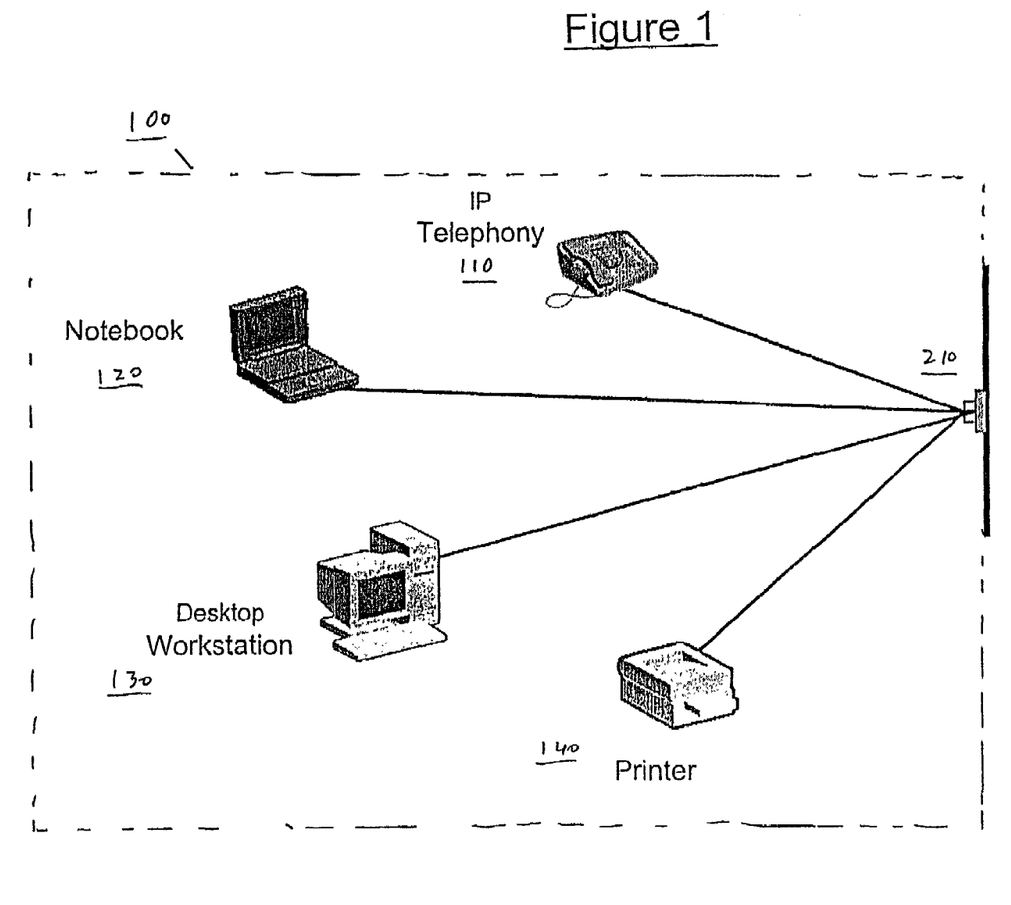
FIG. 1 illustrates an exemplary wired desktop cluster coupled to a local area network (LAN) in accordance with one embodiment of the present invention.

FIG. 1 illustrates an exemplary personal area network (PAN) 100 coupled to a local area network (LAN) 150 in accordance with one embodiment of the present invention. PAN 100 comprises IP telephony 110, notebook 120, desktop workstation 130, and printer 140, each of which is coupled to intelligent data concentrator 210. Intelligent data concentrator 210 is coupled to LAN 150, thus acting as an interface from the various client devices (e.g., comprises IP telephony 110, notebook 120, desktop workstation 130, and printer 140) to LAN 150.

Figure 2:
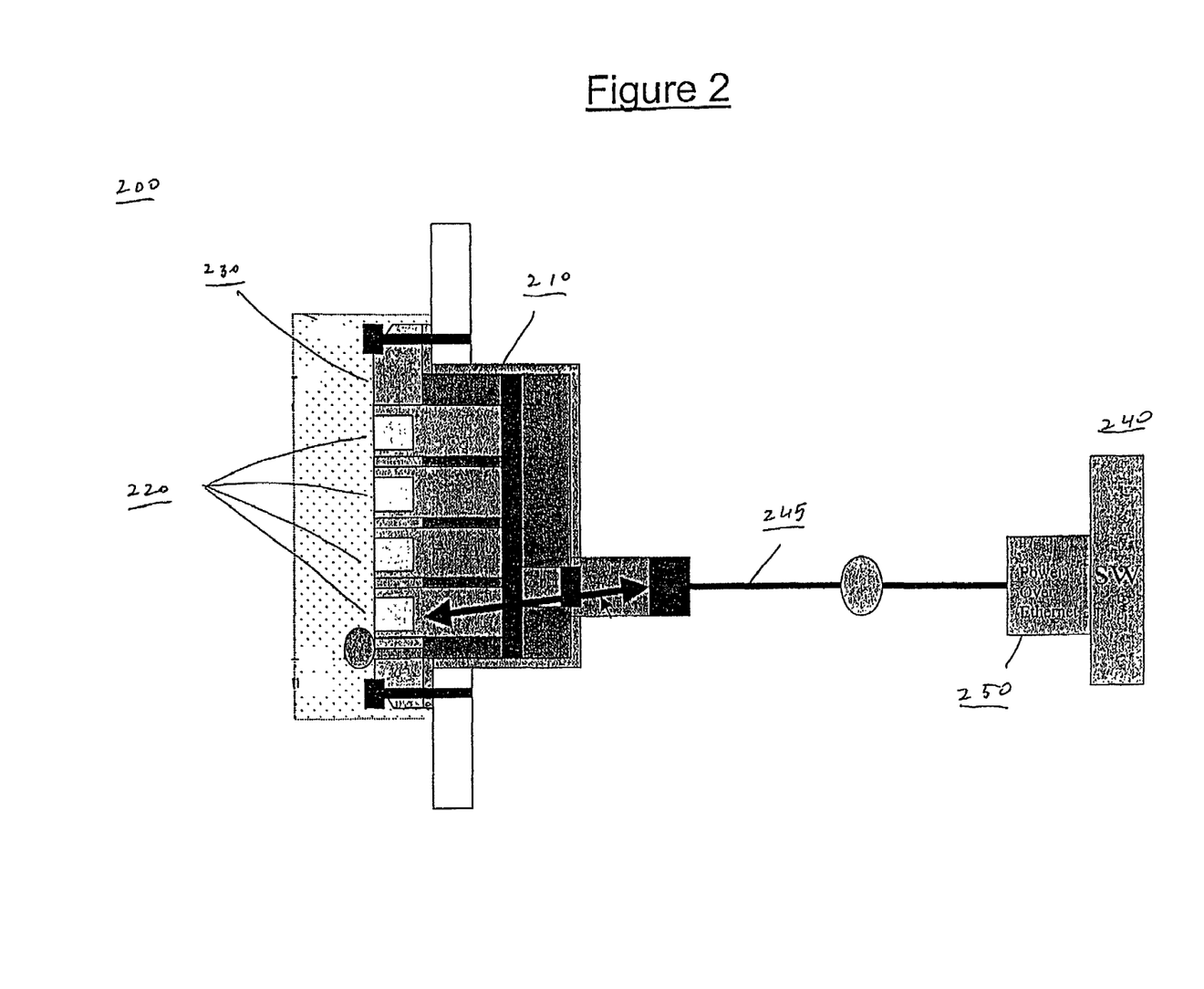
FIG. 2 is a block diagram of a cross-sectional view of an intelligent data concentrator in accordance with one embodiment of the present invention.

FIG. 2 is a block diagram 200 of a cross-sectional view of an intelligent data concentrator 210 in accordance with one embodiment of the present invention. This embodiment of the present invention implements intelligent hardware that is easy to install and reliably provides an attachment point for access to voice and data networks 240. The embodiment is implemented through miniaturized hardware that can be installed inside of a wall or in internal space provided for in an office cubicle. One surface 230 of this embodiment is intended to be accessible by the end user and would in most instances be on an external surface of a workspace.

A plurality of standard communications ports 220 are mounted on the external surface 230 of this embodiment. In one embodiment, communication port 220 is an RJ-45 jack. In another embodiment, communication port 220 is an RJ-11 jack. It should be appreciated that communication port 220 is not limited to any particular jack, and that any type of communication port can be used. Additionally, while intelligent data concentrator 210 illustrates four communication ports 220, it should be appreciated that alternative implementations could support a greater or lesser number of communication ports 220.

Connections to the central data (LAN) or voice network 240 are terminated at intelligent data concentrator 210 for coupling to communication ports 220. Termination of the network cabling 245 (voice or data) will provide for both a reliable electrical and mechanical connection for industry standard communications cabling such as CAT-3, CAT-5, CAT-5E or similar cabling.

In addition to wired connections to and from this embodiment and the client devices, wireless connectivity is a viable method. Infrared (IR), BlueTooth, 802.11 or other means could be utilized to communicate with the device.

In one embodiment, power for intelligent data concentrator, as well as devices connected to it, is provided from a central source 250 over the network cabling 245. The present embodiment is also able to forward power to data devices that are connected to communications ports 220 that are on user accessible surface 230.

Figure 3:
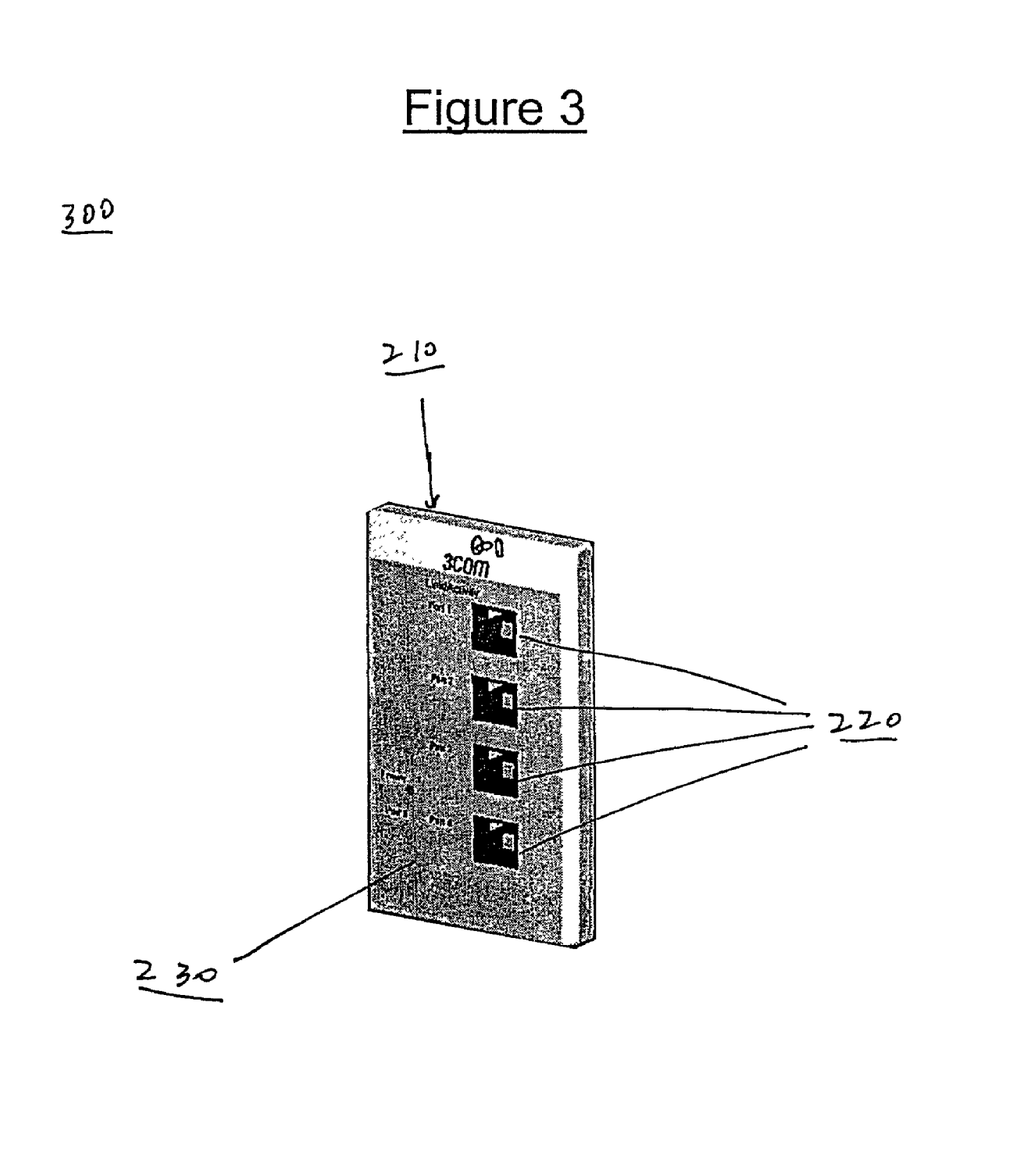
FIG. 3 is an illustration of a perspective view of an exemplary faceplate of an intelligent data concentrator in accordance with one embodiment of the present invention.

FIG. 3 is an illustration of a perspective view 300 of an exemplary user-accessible surface 230 of an intelligent data concentrator 210 in accordance with one embodiment of the present invention. A user is able to connect data devices to a voice or data network through communications ports 220.

Figure 4:
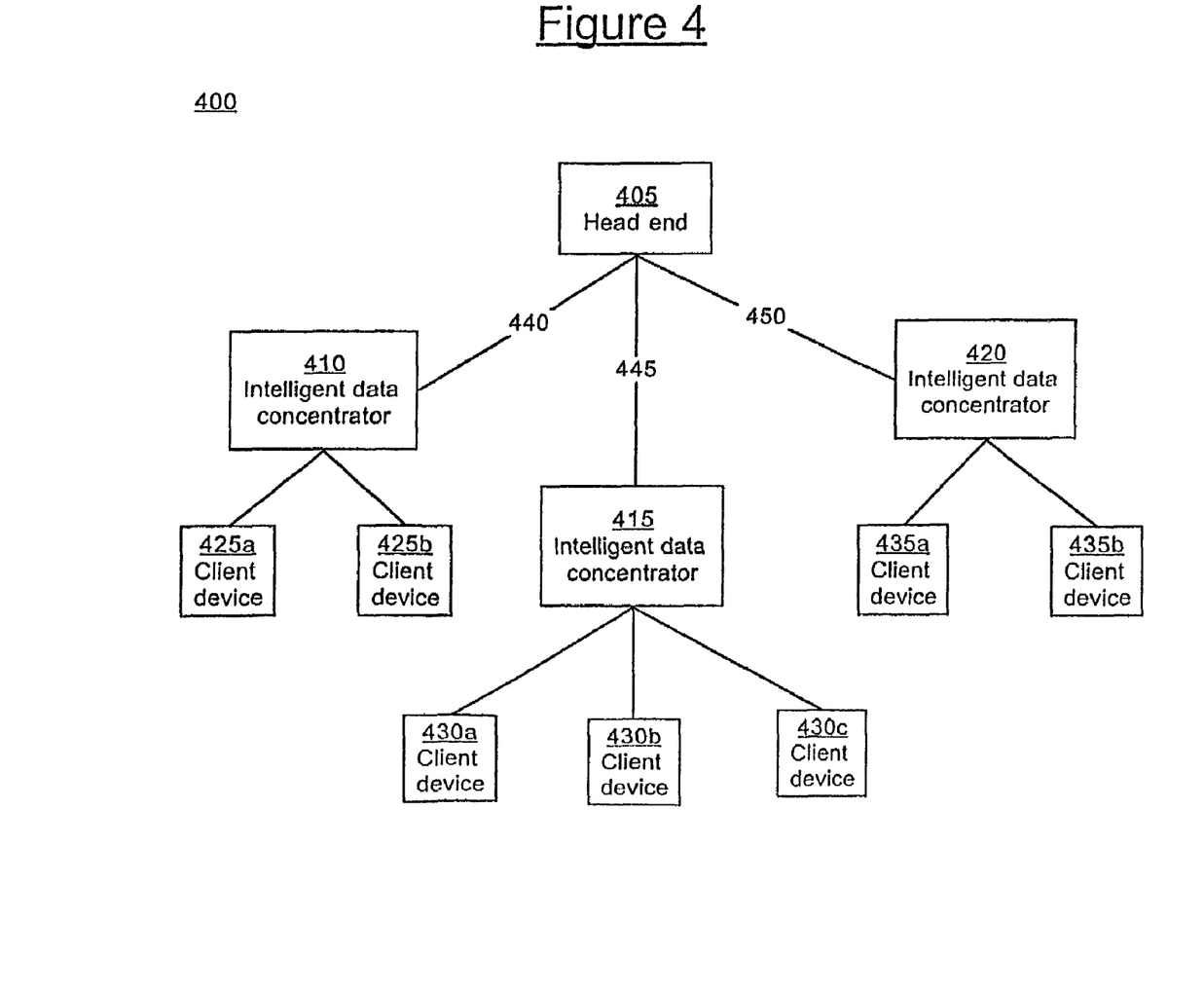
FIG. 4 is a block diagram of an exemplary LAN upon which embodiments of the present invention may be practiced.

FIG. 4 is a block diagram of an exemplary LAN 400 upon which embodiments of the present invention may be practiced. LAN 400 comprises a head end 405 and intelligent devices 410, 415, and 420. In one embodiment, intelligent devices 410, 415 and 420 are intelligent data concentrators (e.g., intelligent data concentrator 210 of FIG. 2 or intelligent data concentrator 502 of FIG. 5). In one embodiment, head end 405 is a central control site that can access the intelligence of intelligent devices 410, 415, and 420. In another embodiment, head end 405 is a central data switch or hub. Intelligent devices 410, 415, and 420 are communicatively coupled to head end 405 over links 440, 445, and 450, respectively. In one embodiment, links 440, 445, and 450 are network cabling.

In one embodiment, intelligent devices 410, 415, and 420 are connected to head end 405 by means of network cabling. In the current embodiment, CAT 3 or 5 cabling is used and an Ethernet physical interface is employed. However, it should be appreciated that the present invention will work with other types of LANs, such as LANs with differing physical connections or adopted for use in RF wireless and optical systems.

Intelligent device 410 is coupled to client devices 425*a* and 425*b*. Similarly, intelligent device 415 is coupled to client devices 430*a*, 430*b* and 430*c*, and intelligent device 420 is coupled to client devices 435*a* and 435*b*. It should be appreciated that client devices can comprise any number of data devices, including but not limited to: computer systems, printers, voice IP telephones, and fax machines configured for use over voice IP networks.

Figure 5:
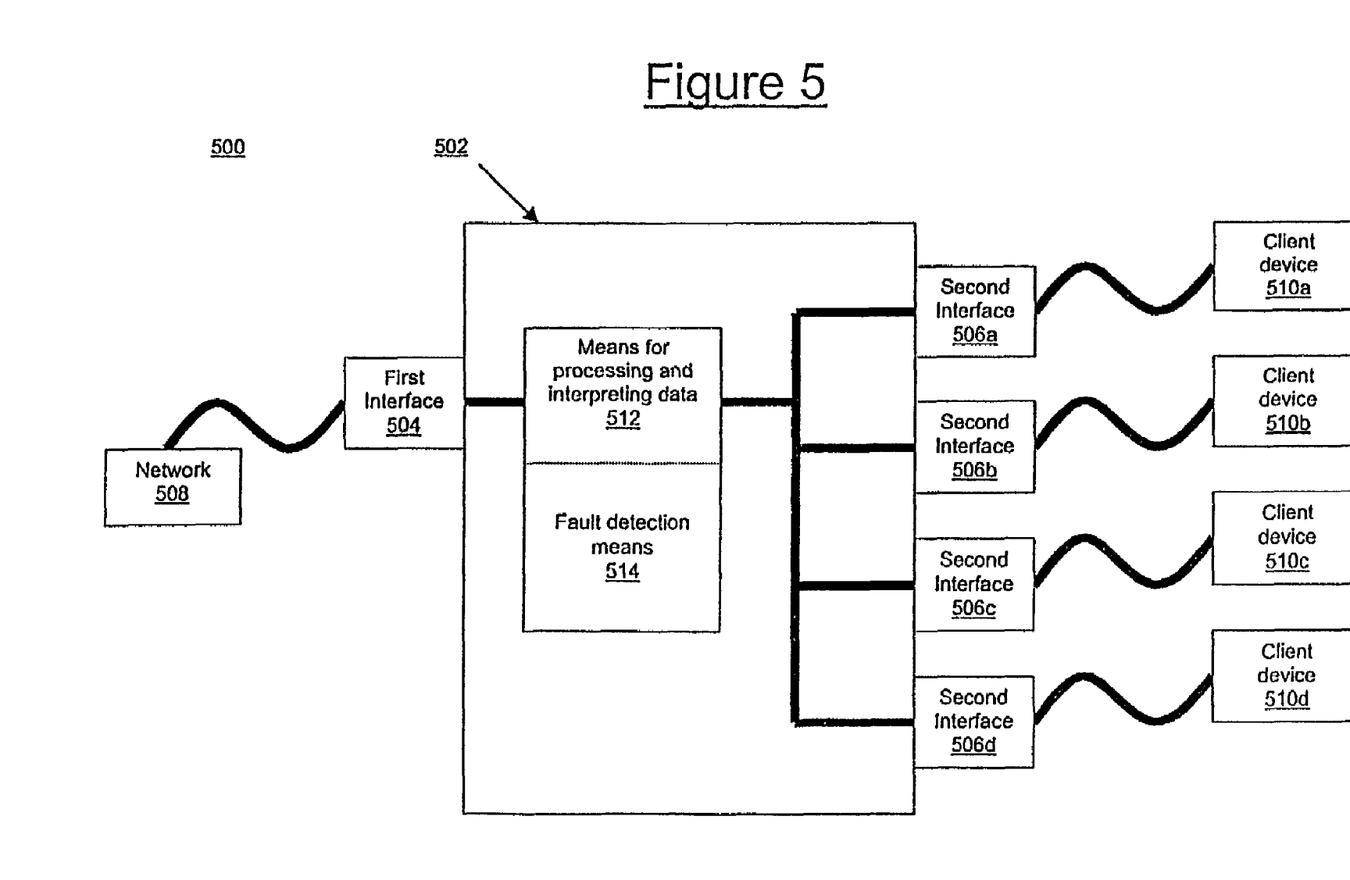
FIG. 5 is a block diagram of an intelligent data concentrator configured for performing a method of fault detection in accordance with an embodiment of the present invention.

FIG. 5 is a block diagram 500 of an intelligent data concentrator 502 configured for performing a method of fault detection in accordance with an embodiment of the present invention.

Intelligent data concentrator 502 comprises a first interface 504 for communicatively coupling intelligent data concentrator 502 to network 508. Intelligent data concentrator 502 also comprises a plurality of second interfaces 506*a-d* for communicatively coupling intelligent data concentrator 502 to a plurality of client devices 510*a-d*. In one embodiment, second interfaces 506*a-d* are communication ports (e.g., communication ports 220 of FIG. 2). It should be appreciated that there can be any number of second interfaces 506*a-d*, and that the present invention is not meant to limit the number of second interfaces 506*a-d*. First interface 504 operating in conjunction with second interfaces 506*a-d* operates to connect client devices 510*a-d* to network 508.

Intelligent data concentrator 502 also comprises means for processing and interpreting data 512 coupled to the first interface 504 and fault detection means 514 coupled to the means for processing and interpreting data 512. Means for processing and interpreting data 512 is intended to include, but not limited to; a robust processor, a central processing unit (CPU), and a random access memory (RAM).

Fault detection means 514 is intended to include, but not limited to: a hardware fault detector, a fault detection circuit, a software fault detector, a link beat signal fault detector, a ping signal fault detector, and a loop-back mode for fault detection. In one embodiment, fault detection means 514 is a fault detector for performing fault detection in a network. In one embodiment, fault detection means 514 is a software implementation for performing fault detection in a network. In one embodiment, fault detection means 514 operates in conjunction with a head end (e.g., head end 405 of FIG. 4) of network 508 for performing fault detection. In another embodiment, fault detection means 514 is for performing fault isolation in a network.

Figure 6:
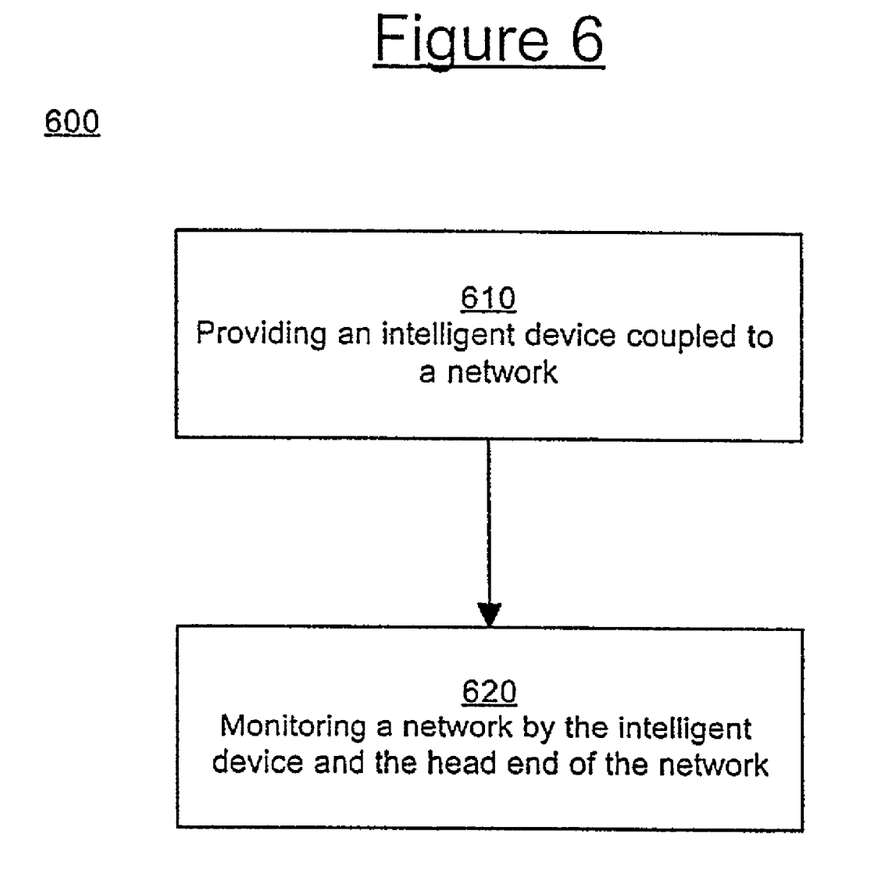
FIG. 6 is a flowchart of the steps in a process for managing the fault detection in a network in accordance with one embodiment of the present invention.

FIG. 6 is a flowchart 600 of the steps in a process for managing the fault detection in a network in accordance with one embodiment of the present invention.

At step 610, an intelligent device coupled to a network is provided. The intelligent device comprises a first interface for communicatively coupling the intelligent device to a network, a second interface for communicatively coupling the intelligent device to a plurality of client devices, a robust processor coupled to the first interface, and a fault detector coupled to the robust processor. In one embodiment, the intelligent device is an intelligent data concentrator (e.g., intelligent data concentrator 502 of FIG. 5).

In one embodiment, the network has a head end. In one embodiment, the head end is a central control site that can access the robust processor of the intelligent device. In another embodiment, the head end is a central data switch or hub.

At step 620 of process 600, the intelligent device and the head end, working in conjunction, monitor the network for a fault. Over the Ethernet, in one embodiment of the present invention, the head end (central equipment) periodically generates a link beat signal, which can be received by the client equipment. This signal serves as an indication that the physical signaling integrity from the host to the client is intact. If the receiving path from the host to the data concentrator located at the client site fails, the intelligence embedded in the data concentrator could detect the absence of a link beat and initiate a transmission to the network control device indicating that the receive path has failed. The address of the network control device could be sent to the client side data concentrator from the central control during the initialization/setup of the concentrator.

In another embodiment, the host (head end) can direct a command such as a ping to the intelligent data concentrator to elicit a response from the concentrator. The receipt of the response by the host side equipment serves to confirm the integrity of the upstream link.

By these means the integrity of the cabling and the ability to communicate to and from the central point to the client could be verified. Also, faults on either the uplink or downlink can be isolated to a specific segment; this information can be determined at the head end. In cases where the fault impacts both the uplink and downlink, such as a cut wire or certain types of failures in the intelligent data concentrator, failure can be inferred by the absence of receiving a response to an issued command. Failure can also be inferred by the absence of a message from the controller that it has not heard from the head end. This test case can be initiated by configuring the head end to stop sending the link beat signal and waiting for a fault message from the controller.

Another method of fault isolation would employ a protocol where the head end switch can issue a command to the intelligence in the invention reversing the role of master and slave would be reversed. With this protocol the lines used to transmit and receive are reversed so the unit could share information over a single healthy channel.

Another means to aid in the detection of communications faults is to provide a loop-back capability in the physical media interface circuitry. Under normal operation, data flows from the head end and is received by the client while data intended for the head end is sent over a separate interface and media channel. The reception and transmission of data involves circuitry that implements the Media Access Control (MAC) layers of the network protocol as well as the involvement of the Central Processing Unit (CPU) elements. Failures in the circuitry implementing the MAC or in the embedded CPU can be detected by using traditional self-diagnostic techniques combined with a watchdog circuit that can detect the absence of normal activity in the CPU, MAC & other circuit elements. If the activity ceases, the watchdog timer detects and signals this event; this information is used to place the media interface transceivers in loop-back mode. In loop-back mode, information or data received from the host is turned around and placed directly back on the transmitter and returned to the host. The host is able to see that the data is being looped back and that the client side intelligence (MAC, CPU, etc.) has failed.

When a failure in the client side intelligence is detected an additional level of fault detection/recovery can be implemented. After entering the loop-back mode, the central site can try and reset the intelligent client controller to see if the fault is permanent (hard) or if the problem was transitory in nature. There are several ways to reset the client equipment.

One method is to have the host remove and reapply the power that is supplied to the client device over the network cable, resulting in a restart of the client logic. Another method would be to send a special series of data packets to the client device that can be detected by circuitry such as a state machine and used to generate a reset signal. Another way to implement a loop-back/reset sequence is to employ the loop-back mechanism to place the data multiplexor in loop-back mode for a period of time that is sufficient to have the host detect this state and then to self generate a reset signal while maintaining a local status indication that a hang reset sequence has occurred. If the reset revives the controller, the card would then send a message to the host. If the watchdog were to fail again, the card would be left in loop-back mode and the local generation of the reset could be disabled.

In all scenarios local status indication on a panel mounted indicator, such as an LED, would be provided. In the absence of an ability of the central controller to communicate with the data concentrator, the health of the concentrator could be determined by physically inspecting the indicator lights or displays.

The embedded intelligence in the remote data multiplexor is able to employ time domain reflectometry (TDR) measurement techniques to determine whether the cable is intact and to determine the length of the cable. If a fault exists in the cable, the TDR function is able to determine the distance to the fault (open or short). If no faults exist, the length of the entire cable can be determined. This information can be employed to further isolate the source of a failure. For example, if no link beats are being received from the host, it can be determined whether the cable is at fault for the failure. The results of this test can be passed to the host on the uplink from the device to the host. Other standard cable tests (e.g., TIA or BICSI) can be conducted by the present invention with the results shared with the head end through the cabling.

In one embodiment, in the place of a ping, a specific dump status/diagnose command is directed to the client which, initiating a transmission from the client side data concentrator, thus running a specific test between the client side concentrator and the local network devices connected to it. The data returned to the hosts would contain reports on the health of the network connections further down the chain. The ability to run comprehensive tests can enable a network administrator to validate the health of the network and pinpoint faults that may exist from a central point. None of the above techniques preclude or eliminate the older more intrusive diagnostic methods that have been traditionally employed to validate client host networks.

When the device is first being installed, there are additional features of the invention that are intended to ease the installation process. Prior to the application of power to the device, the physical line that is connected to the uplink is connected to one of the data jacks on the external side. The hard cut-through allows installation technicians to run continuity checks through the cabling. The cut-through mode allows for a fault tolerant port that continues to function in the absence of power on the data lines. Another use for the cut-through mode is to have the previously described watch dog timer/internal diagnostics force this mode if a hard fault in the internal intelligence was detected.

In one embodiment, when power is first applied to the intelligent multiplexor, the unit will repeatedly send out an identification string that contains the device identification (ID) number and unit revision number by placing a harmonic rich signal on the transmit lines. The signal is designed to be received by an inductive coupled audio signal tracer. The signal can be heard when the probe is brought in proximity to the line. The installer working on connecting the wires to a patch panel can use common tools of the wiring trade to directly receive the device number which will allow the information to be marked without having to communicate or coordinate with the craftsman that installed the invention in the remote work space. In one embodiment, the method of encoding the signal is to send the information as a series or tone pulses. Once installed, the control console could initiate a command message directed to the unit connected to the physical drop to command the device to stop sending the ID sequence. The central control console is able to send this command since the port that the device is connected to is known and the internet protocol (IP) address of the drop is assigned to the port on a fixed or Dynamic Host Configuration Protocol (DHCP) basis.

Once connectivity between the head end and the intelligent multiplexor has been established and verified, testing of the links between the connected client devices can be tested and confirmed. The personal area network (PAN) side links can be tested by employing similar techniques as were described above. The multiplexor can send a ping or similar command to the device and check for a response.

If necessary (e.g., if the ping to the client device did not return a response), the data path through the line drivers to and from the PAN devices can be validated by placing the paths into a local loop-back mode where the internal intelligence can direct data packets through the loop-back physical jack (e.g., a PHY jack).

After basic connectivity and communications between the central switch, the intelligent data multiplexor and the management console have been established and verified the power feed to the client devices can be activated. Once power is applied, if the amount of current that is drawn ever exceeds a safe limit the power can be removed or limited in a safe manner and the existence of the fault condition can be detected by the intelligence and communicated to a management station.

The preferred embodiment of the present invention, a device and method for managing fault detection and fault isolation in voice and data networks, is thus described. While the present invention has been described in particular embodiments, it should be appreciated that the present invention should not be construed as limited by such embodiments, but rather construed according to the below claims.

What is claimed is:

1. An intelligent data concentrator, comprising:
   a housing having a first surface and a second surface and configured to be mounted substantially within a cavity in a wall in such a way that the first surface is internal to the wall and the second surface is external the cavity and substantially planar with the wall, said housing further comprising;
      a first interface at the first surface operable to physically couple to a dedicated drop of network cabling terminating within the wall and to communicating couple said intelligent data concentrator to said network, said network having a head end at an opposite end of the network cabling, wherein said head end is a central control site at operable to remotely access said intelligent data concentrator over said network;
      a second interface at the second surface comprising a plurality of communication ports for communicatively coupling said intelligent data concentrator to a plurality of client devices at said plurality of communication ports such that said client devices are communicatively coupled to said network;
   means for processing and interpreting data internal to the housing and coupled to said first interface; and
   fault detection means internal to the housing and coupled to said means for processing and interpreting data, said fault detection means operable to identify, based on a physical location of the housing and communications from the head end, a physical location of a fault in the network.

2. An intelligent data concentrator as recited in claim 1 wherein said head end is operable to remotely access said means for processing and interpreting data.

3. An intelligent data concentrator as recited in claim 1 wherein said fault detection means is configured to isolate faults in both an uplink from said head end of said network and a downlink from said head end of said network.

4. An intelligent data concentrator as recited in claim 1 wherein said fault detection means is selected from the group consisting essentially of:
   a link beat signal fault detection, a ping signal fault detection, and a loop-back mode for fault detection.

5. An intelligent data concentrator as recited in claim 1 wherein said intelligent data concentrator is configured such that said intelligent data concentrator is provided power over said network.

6. An intelligent data concentrator as recited in claim 5 wherein said head end is configured to activate and deactivate said intelligent data concentrator over said network.

7. An intelligent data concentrator as recited in claim 5 wherein said intelligent data concentrator is configured to activate and deactivate said client devices.

8. An intelligent data concentrator as recited in claim 1 wherein said intelligent data concentrator employs time domain reflectometry measurement techniques such that said fault detection means is operable to determine a distance from said intelligent data concentrator to said fault.

9. An intelligent data concentrator as recited in claim 1 wherein said intelligent data concentrator is configured to receive data packets from said head end.

10. An intelligent data concentrator as recited in claim 9 wherein said data packets are for operating diagnostic tests at said intelligent data concentrator for validating network connections.

11. A method for fault detection in a network, said method comprising the steps of:
   a) providing an intelligent data concentrator coupled to a network, said intelligent data concentrator comprising a housing having a first surface and a second surface and configured to be mounted substantially within a cavity in a wall in such a way that the first surface is internal to the wall and the second surface is external the cavity and substantially planar with the wall, said housing further comprising;
      a first interface at the first surface operable to physically couple to a dedicated drop of network cabling terminating within the wall and to communicatively couple said intelligent data concentrator to said network, said network having a head end, wherein said head end is a central control site at operable to remotely access said intelligent data concentrator over said network;
      a second interface at the second surface comprising a plurality of communication ports for communicatively coupling said intelligent data concentrator to a plurality of client devices at said plurality of communication ports such that said client devices are communicatively coupled to said network;
   means for processing and interpreting data internal to the housing and coupled to said first interface; and
   fault detection means internal to the housing and coupled to said means for processing and interpreting data, said fault detection means operable to identify, based on a physical location of the housing and communications from the head end, a physical location of a fault in the network;
   b) monitoring said network for a fault by said intelligent data concentrator and said head end, such that said intelligent data concentrator and said head end operate in conjunction to identify a physical location of the fault.

12. A method as recited in claim 11 wherein said head end is operable to remotely access said means for processing and interpreting data.

13. A method as recited in claim 11 wherein said fault detector is configured to isolate faults in both an uplink from said head end or said network and a downlink from said head end of said network.

14. A method as recited in claim 11 wherein said fault detector is selected from the group consisting essentially of: a link beat signal fault detector, a ping signal fault detector, and a loop-back mode for fault detection.

15. A method as recited in claim 11 wherein said intelligent data concentrator is configured such that said intelligent data concentrator is provided power over said network.

16. A method as recited in claim 15 wherein said head end is configured to activate and deactivate said intelligent data concentrator over said network.

17. A method as recited in claim 15 wherein said intelligent data concentrator is configured to activate and deactivate said client devices.

18. A method as recited in claim 11 wherein said intelligent data concentrator employs time domain reflectometry measurement techniques such that said fault detection means is operable to determine a distance from said intelligent data concentrator to said fault.

19. A method as recited in claim 11 wherein said intelligent data concentrator is configured to receive data packets from said head end.

20. A method as recited in claim 19 wherein said data packets are for operating diagnostic tests at said intelligent data concentrator for validating network connections.

* * * * *